United States Patent
Canfield et al.

(10) Patent No.: US 9,205,437 B2
(45) Date of Patent: Dec. 8, 2015

(54) DISPENSING DEVICE

(71) Applicant: APTAR DORTMUND GMBH, Dortmund (DE)

(72) Inventors: Reiker Canfield, Crystal Lake, IL (US); Bernd Blumenstein, Dortmund (DE); Ralf Jordan, Dortmund (DE); Reinhard Neuhaus, Hemer (DE)

(73) Assignee: APTAR DORTMUND GMBH, Dortmund (DE)

( * ) Notice: Subject to any disclaimer, the term of this patent is extended or adjusted under 35 U.S.C. 154(b) by 0 days.

(21) Appl. No.: 14/096,168

(22) Filed: Dec. 4, 2013

(65) Prior Publication Data

US 2014/0091109 A1   Apr. 3, 2014

Related U.S. Application Data

(60) Division of application No. 13/529,109, filed on Jun. 21, 2012, now Pat. No. 8,602,266, which is a continuation of application No. 12/293,045, filed as application No. PCT/EP2007/002282 on Mar. 15, 2007, now Pat. No. 8,225,966.

(30) Foreign Application Priority Data

Mar. 15, 2006   (DE) .......................... 10 2006 012 302

(51) Int. Cl.
*B65D 37/00* (2006.01)
*B05B 11/00* (2006.01)
(Continued)

(52) U.S. Cl.
CPC ............ *B05B 11/0005* (2013.01); *A45D 34/04* (2013.01); *B05B 11/007* (2013.01);
(Continued)

(58) Field of Classification Search
CPC ...... B65D 83/48; B65D 83/208; B65D 83/44; B65D 83/20; B05B 11/3023; B05B 11/3016; B05B 11/3033; B05B 11/3036; B05B 11/007; B05B 11/0005; A45D 34/04
USPC ................. 222/207, 209, 206, 212–215, 479, 222/402.13, 402.15, 402.1, 149, 55, 222/321.7–321.9, 402.22, 402.23, 380
See application file for complete search history.

(56) References Cited

U.S. PATENT DOCUMENTS

| 2,500,687 A | 3/1950 | Kamp et al. |
| 2,714,475 A | 8/1955 | Roehrich |

(Continued)

FOREIGN PATENT DOCUMENTS

| DE | 2043415 | 9/1970 |
| DE | 2920497 | 11/1980 |

(Continued)

OTHER PUBLICATIONS

U.S. Appl. No. 12/600,219, filed Mar. 13, 2010, Canfield et al.
(Continued)

*Primary Examiner* — Lien Ngo
(74) *Attorney, Agent, or Firm* — Jason H. Vick; Sheridan Ross, PC

(57) ABSTRACT

A dispensing device for a preferably cosmetic liquid as well as a method for the manufacture thereof are proposed. A lasting and tight joining of two materials is achieved while allowing for simple manufacture by pretreating the surface of the first material by means of plasma treatment or irradiation in a desired joining area in order to form radicals there or to break up the polymer chains of the first material, and by then injecting the second material directly against the first material. Another aspect consists in covering the first material with a second material for joining with another material or component.

31 Claims, 9 Drawing Sheets

(51) Int. Cl.
*A45D 34/04* (2006.01)
*B29C 45/16* (2006.01)
*B65D 83/20* (2006.01)
*B29C 59/14* (2006.01)

(52) U.S. Cl.
CPC ......... *B05B11/3032* (2013.01); *B05B 11/3033* (2013.01); *B29C 45/1657* (2013.01); *B29C 45/1676* (2013.01); *B65D 83/20* (2013.01); *B29C 59/14* (2013.01); *Y10T 29/494* (2015.01); *Y10T 29/49826* (2015.01); *Y10T 156/10* (2015.01)

(56) References Cited

U.S. PATENT DOCUMENTS

| | | |
|---|---|---|
| 2,721,010 A | 10/1955 | Meshberg |
| 2,736,930 A | 3/1956 | Longley |
| 2,812,884 A | 11/1957 | Ward |
| 2,837,249 A | 6/1958 | Meshberg |
| 2,884,164 A | 4/1959 | Kleid |
| 2,980,301 A | 4/1961 | Gorter |
| 3,018,928 A | 1/1962 | Meshberg |
| 3,073,489 A | 1/1963 | Friedman |
| 3,104,785 A | 9/1963 | Beard, Jr. |
| 3,131,834 A | 5/1964 | Meshberg |
| 3,162,333 A | 12/1964 | Davidson |
| 3,258,369 A | 6/1966 | Blaich |
| 3,385,482 A | 5/1968 | Frangos |
| 3,507,586 A | 4/1970 | Gronemeyer et al. |
| 3,511,418 A | 5/1970 | Venus, Jr. |
| 3,542,253 A | 11/1970 | Weber et al. |
| 3,608,830 A | 9/1971 | Ramella |
| 3,651,558 A | 3/1972 | Chase |
| 3,672,543 A | 6/1972 | Roper et al. |
| 3,698,961 A | 10/1972 | Niemann |
| 3,706,393 A | 12/1972 | Curtis et al. |
| 3,726,442 A | 4/1973 | Davidson et al. |
| 3,795,350 A | 3/1974 | Shay |
| 3,796,356 A | 3/1974 | Venus, Jr. |
| 3,820,689 A | 6/1974 | Cocita |
| 3,931,831 A | 1/1976 | French |
| 3,961,725 A | 6/1976 | Clark |
| 3,991,916 A * | 11/1976 | Del Bon .................. 222/402.13 |
| 4,035,303 A | 7/1977 | Ufferfilge |
| 4,099,651 A | 7/1978 | Von Winckelmann |
| 4,215,725 A | 8/1980 | Callet et al. |
| 4,222,501 A | 9/1980 | Hammett et al. |
| 4,265,752 A | 5/1981 | O'Banion |
| 4,304,749 A | 12/1981 | Bauer |
| 4,352,443 A | 10/1982 | Libit |
| 4,387,833 A | 6/1983 | Venus, Jr. |
| 4,416,602 A | 11/1983 | Neumeister |
| 4,423,829 A | 1/1984 | Katz |
| 4,458,832 A | 7/1984 | Corsette |
| 4,564,130 A | 1/1986 | Eulenburg |
| 4,830,229 A | 5/1989 | Ball |
| 4,867,347 A | 9/1989 | Wass et al. |
| 4,875,604 A | 10/1989 | Czech |
| 4,892,231 A | 1/1990 | Ball |
| 4,919,312 A | 4/1990 | Beard et al. |
| 4,964,852 A | 10/1990 | Dunning et al. |
| 4,969,577 A | 11/1990 | Werding |
| 5,007,556 A | 4/1991 | Lover |
| 5,007,596 A | 4/1991 | Iwahashi |
| 5,096,098 A * | 3/1992 | Garcia .................. 222/402.13 |
| 5,123,571 A | 6/1992 | Rebeyrolle et al. |
| 5,143,486 A | 9/1992 | Geoffroy |
| 5,190,190 A | 3/1993 | Fudalla |
| 5,197,637 A | 3/1993 | Naumann |
| 5,221,724 A | 6/1993 | Lie et al. |
| 5,249,713 A * | 10/1993 | Reich et al. .................. 222/321.8 |
| 5,271,432 A | 12/1993 | Gueret |
| 5,301,850 A | 4/1994 | Gueret |
| 5,360,145 A | 11/1994 | Gueret |
| 5,413,250 A | 5/1995 | Gueret |
| 5,454,488 A | 10/1995 | Geier |
| 5,465,872 A | 11/1995 | Gueret |
| 5,492,252 A | 2/1996 | Gueret |
| 5,505,341 A | 4/1996 | Gueret |
| 5,509,582 A | 4/1996 | Robbins, III |
| 5,516,053 A | 5/1996 | Hannu |
| 5,687,884 A * | 11/1997 | Bodin et al. .................. 222/321.7 |
| 5,728,333 A | 3/1998 | Tabata et al. |
| 5,732,855 A | 3/1998 | Van der Heijden |
| 5,743,441 A | 4/1998 | Baudin et al. |
| 5,769,283 A | 6/1998 | Owada et al. |
| 5,823,383 A | 10/1998 | Hins |
| 5,857,224 A | 1/1999 | Oberg et al. |
| 5,862,955 A | 1/1999 | Albini et al. |
| 5,868,287 A | 2/1999 | Kurolkawa et al. |
| 5,873,491 A | 2/1999 | Garcia et al. |
| 5,875,936 A | 3/1999 | Turbett et al. |
| 5,875,939 A | 3/1999 | Geier |
| 5,881,929 A | 3/1999 | Coerver, Jr. |
| 5,913,449 A | 6/1999 | Branch et al. |
| 5,927,568 A | 7/1999 | De Nervo et al. |
| 5,975,381 A | 11/1999 | Revenu |
| 6,007,914 A | 12/1999 | Joseph et al. |
| 6,083,450 A | 7/2000 | Safian |
| 6,085,945 A | 7/2000 | Fransen |
| 6,112,953 A | 9/2000 | Gueret |
| 6,116,475 A * | 9/2000 | Delage .................. 222/494 |
| 6,145,707 A | 11/2000 | Baudin |
| 6,216,916 B1 | 4/2001 | Maddox et al. |
| 6,298,960 B1 | 10/2001 | Derr |
| 6,322,542 B1 | 11/2001 | Nilson et al. |
| 6,328,920 B1 | 12/2001 | Uchiyama et al. |
| 6,352,184 B1 | 3/2002 | Stern et al. |
| 6,505,986 B1 | 1/2003 | Oder |
| 6,589,216 B1 | 7/2003 | Abbott et al. |
| 6,629,799 B2 | 10/2003 | Flores, Jr. |
| 6,681,955 B2 | 1/2004 | Rosenbaum |
| 6,756,004 B2 | 6/2004 | Davis et al. |
| 6,778,089 B2 | 8/2004 | Yoakum |
| 6,832,704 B2 | 12/2004 | Smith |
| 6,919,114 B1 | 7/2005 | Darras et al. |
| 6,966,465 B2 | 11/2005 | Kang |
| 7,264,142 B2 | 9/2007 | Py |
| 7,516,871 B2 | 4/2009 | Gerbron |
| 7,651,013 B2 * | 1/2010 | Laidler et al. .................. 222/402.13 |
| 7,762,435 B2 * | 7/2010 | De'Padova et al. .................. 222/402.13 |
| 7,775,461 B2 | 8/2010 | Laidler et al. |
| 7,780,045 B2 | 8/2010 | Rossignol |
| 7,810,677 B2 | 10/2010 | Py et al. |
| 7,854,355 B2 | 12/2010 | Rossignol |
| 7,913,877 B2 | 3/2011 | Neuhalfen |
| 8,225,966 B2 | 7/2012 | Canfield et al. |
| 8,240,518 B2 | 8/2012 | Canfield |
| 8,261,952 B2 | 9/2012 | Canfield et al. |
| 8,286,839 B2 | 10/2012 | Jasper |
| 8,292,121 B2 | 10/2012 | Davideit et al. |
| 8,453,875 B2 | 6/2013 | Neuhaus |
| 8,573,449 B2 | 11/2013 | Neuhaus et al. |
| 2001/0025863 A1 * | 10/2001 | Lorscheidt et al. .................. 222/256 |
| 2002/0037179 A1 | 3/2002 | Suzuki et al. |
| 2002/0051314 A1 | 5/2002 | Hayashi |
| 2002/0074355 A1 | 6/2002 | Lewis et al. |
| 2002/0190085 A1 | 12/2002 | Stanford |
| 2003/0071080 A1 | 4/2003 | Yquel |
| 2003/0230603 A1 | 12/2003 | Smith |
| 2005/0155980 A1 | 7/2005 | Neuhalfen |
| 2006/0060618 A1 | 3/2006 | Hoepner et al. |
| 2006/0231519 A1 | 10/2006 | Py et al. |
| 2006/0237486 A1 | 10/2006 | Kersten |
| 2007/0228082 A1 | 10/2007 | Jasper et al. |
| 2007/0272767 A1 | 11/2007 | Niggeman |
| 2008/0110941 A1 | 5/2008 | Foster et al. |
| 2008/0197152 A1 | 8/2008 | Neuhaus et al. |
| 2009/0212075 A1 | 8/2009 | Neuhaus et al. |
| 2009/0294480 A1 | 12/2009 | Canfield |
| 2010/0147898 A1 | 6/2010 | Blumenstein et al. |
| 2010/0200616 A1 * | 8/2010 | Decottignies .................. 222/207 |

(56) References Cited

U.S. PATENT DOCUMENTS

| | | | |
|---|---|---|---|
| 2010/0206911 A1 | 8/2010 | Bernhard |
| 2010/0308077 A1 | 12/2010 | Sonntag |
| 2012/0273525 A1 | 11/2012 | Canfield |

FOREIGN PATENT DOCUMENTS

| | | | |
|---|---|---|---|
| DE | 9307083 | 7/1993 | |
| DE | 4210225 | 9/1993 | |
| DE | 19851659 | 11/1998 | |
| DE | 29820894 | 1/1999 | |
| DE | 19744510 | 4/1999 | |
| DE | 19832824 | 2/2000 | |
| DE | 19950512 | 5/2001 | |
| DE | 20203841 | 6/2002 | |
| DE | 10308727 | 6/2004 | |
| DE | 202004011219 | 11/2004 | |
| DE | 202004011220 | 11/2004 | |
| DE | 20200512684 | 11/2005 | |
| EP | 0058700 | 9/1982 | |
| EP | 0069738 | 1/1983 | |
| EP | 0179538 | 4/1986 | |
| EP | 0320510 | 6/1989 | |
| EP | 0442858 | 8/1991 | |
| EP | 0599301 | 6/1994 | |
| EP | 0864371 | 9/1998 | |
| EP | 0893356 | 1/1999 | |
| EP | 0908395 | 4/1999 | |
| EP | 0930102 | 7/1999 | |
| EP | 1084669 | 3/2001 | |
| EP | 1327478 | 7/2003 | |
| EP | 1637232 | 3/2006 | |
| FR | 1266391 | 7/1961 | |
| FR | 2127774 | 10/1972 | |
| FR | 2510069 | 1/1983 | |
| FR | 2654079 | 11/1989 | |
| FR | 2783667 | 3/2000 | |
| FR | 2838108 | 10/2003 | |
| FR | 2919589 | * 2/2009 | ............... 222/403.13 |
| GB | 1405546 | 8/1972 | |
| GB | 1523732 | 9/1978 | |
| GB | 2083142 | 3/1982 | |
| GB | 2105729 | 3/1983 | |
| GB | 2150226 | 6/1985 | |
| GB | 2155435 | 9/1985 | |
| GB | 2161222 | 1/1986 | |
| JP | 07251884 | 3/1995 | |
| JP | 09039467 | 2/1997 | |
| JP | 2001-063781 | 3/2001 | |
| WO | WO-94/16971 | * 8/1994 | ............... 222/403.13 |
| WO | WO 96/16746 | 6/1996 | |
| WO | WO 00/26007 | 5/2000 | |
| WO | WO 00/44505 | 8/2000 | |
| WO | WO 01/25116 | 4/2001 | |
| WO | WO 02/079679 | 10/2002 | |
| WO | WO 2004/022143 | 3/2004 | |
| WO | WO 2004/073871 | 9/2004 | |
| WO | WO 2004/073877 | 9/2004 | |
| WO | WO 2005/000731 | 1/2005 | |
| WO | WO 2005/123542 | 12/2005 | |
| WO | WO 2005/123543 | 12/2005 | |
| WO | WO 2006/123168 | 11/2006 | |
| WO | WO 2006/128574 | 12/2006 | |
| WO | WO 2007/062824 | 6/2007 | |
| WO | WO 2007/104561 | 9/2007 | |
| WO | WO 2009/030393 | 3/2009 | |

OTHER PUBLICATIONS

Wacker Silicones, Geniomer® 200 Thermoplastic Silicone Elastomer, Jan. 10, 2005, XP002394023, retrieved from Internet address http://www.wacker.com/internet/webcache/en_US?PTM?TM?GENIOMER/GENIOMER_200_e.pdf on Aug. 8, 2006.

International Search Report prepared by the European Patent Office on Jan. 23, 2008 for International Application No. PCT/EP2007/002282; Applicant, Seaquist Perfect Dispensing GMBH.

Written Opinion prepared by the European Patent Office on Jan. 23, 2008 for International Application No. PCT/EP2007/002282; Applicant, Seaquist Perfect Dispensing GMBH.

* cited by examiner

DISPENSING DEVICE

CROSS REFERENCE TO RELATED APPLICATIONS

This application is a Divisional of U.S. patent application Ser. No. 13/529,109, filed Jun. 21, 2012, now U.S. Pat. No. 8,602,266, which is a Continuation of U.S. patent application Ser. No. 12/293,045, filed Apr. 7, 2009, now U.S. Pat. No. 8,225,966, which is a national stage application under 35 U.S.C. 371 of PCT Application No. PCT/EP2007/002282 having an international filing date of 15 Mar. 2007, which designated the United States, which PCT application claimed the benefit of German Application No. 10 2006 012 302.6 filed 15 Mar. 2006, the entire disclosures of each of which are hereby incorporated herein by reference.

SUMMARY

The present invention relates to a dispensing device for a preferably cosmetic liquid as well as method for the manufacture thereof.

The term "dispensing device" is to be understood in the present invention particularly as a dispensing head which is preferably mounted or mountable on a container or its delivery valve or on a hand-operated pump. In particular, it can be a pressurized container, a dispenser pump or the like. The dispensing device is preferably used for the non-spraying discharging or dispensing of a preferably cosmetic liquid. However, it can also be a dosing pump or hand-operated pump or any other output device such as a container, dispensing or spray head, dispenser or the like, particularly for a cosmetic liquid.

The term "cosmetic liquid" is to be understood, in a narrower sense, as cosmetics, hair spray, hair lacquer, a deodorant, a foam, particularly shaving foam, a gel, a color spray, a sun protection or skin care agent or the like. Preferably, however, in a broader sense, other body care products, cleaning products or the like, and even suspensions and fluids, particularly those with gas phases, are included as well. Moreover, as other liquids, for example air improvers and particularly technical liquids and fluids as well such as rust removers and the like, can also be used. Nonetheless, for the sake of simplicity and due to the emphasized use, there is often only mention of cosmetic liquid in the following.

In today's dispensing devices for the dispensing, particularly, of foaming or foamed liquids such as shaving foam, or in dispenser pumps, there is often the problem that the liquids or products formed therefrom come out after the actual dispensing is finished, in particular foaming or dripping out afterwards. This problem is particularly glaring in shaving foam or the like but also occurs in non-foamed or non-foaming liquids and can lead, in particular, to undesired contamination of the dispensing devices.

EP 0 442 858 B1 discloses a dispensing device with a lower part and an elastic upper part. Formed between the upper part and the lower part are a pump chamber and a discharge valve that opens as a result of the pressure of the liquid. By pressing the upper part down, a liquid can be forced from the pump chamber and dispensed via the discharge valve. Occurring subsequently is an automatic elastic closing of the discharge valve and restoration of the upper part in its previous place, with new liquid being sucked into the pump chamber. It is difficult to join the upper part to the lower part in a tight fashion and to find a suitable material for the upper part in order to achieve the desired characteristics—particularly, high chemical resistance and high restorative forces.

WO 01/025116 A1 discloses a dispensing head for a container under pressure. Upon actuation of the dispensing head, a delivery valve of the container is opened in order to deliver a foam or a gel via a discharge channel formed in the dispensing head. The discharge channel is provided on the discharge side with a discharge valve in order to prevent a subsequent foaming or dripping after actuation of the dispensing head. The discharge valve is embodied, in particular, as a self-closing slit valve. It has turned out that, in practice, such a valve does not close satisfactorily. Moreover, the manufacture of the dispensing head is difficult, since the discharge valve has to be manufactured as a separate part and then tightly built in.

It is the object of the present invention to provide an improved dispensing device and a method for the manufacture thereof, so that optimum material combinations and/or a lasting and/or tight joining of materials is/are made possible with a simple, cost-effective construction.

The aforementioned object is achieved by means of a dispensing device according to the claims appended hereto. Advantageous modifications are the object of the subclaims.

One aspect of the present invention consists in making possible the joining of two materials, particularly equal or different plastics, in that a material or its surface is pretreated such that the other material is particularly injected directly against the first material and can be joined to same as a result. Especially preferably, no further measures, processing, adhesion promoters or the like are then necessary. The pretreatment occurs particularly by means of plasma treatment and/or irradiation.

After the pretreatment, the other or second material can be injected by means of so-called "bi-injection" (i.e. in the injection mold in which the first material was previously cast or injected) directly against the pretreated or first material and be solidly joined to same as a result. In the present invention, solid joining or joining is to be understood as a chemical and/or connection.

According to another especially preferred aspect, the pretreatment occurs only in areas or only in a desired area. This area can be determined very easily and cost-effectively using a mask, screen or the like during pretreatment. A joining or adhesion of the two materials, particularly of the second material to the first material, then occurs only in the pretreated area. It is then possible, for instance, to inject the second material against the first material over the entire surface but to achieve, in the end, a joint with the first material only in the pretreated partial area. In the other area, the second material or the component or the like formed therefrom—depending on the need, construction, or the like—can detach again and form, for example, a chamber that is in contact with the liquid, a pump chamber or, especially preferably, a valve or a discharge channel which closes again, for example, or the like.

Another aspect of the present invention which can also be realized independently consists in covering a first component made of a first material with the second material in order to make a joining to another component or material possible. Here, too, the especially preferred pretreatment can be used for the joining of the second material with the first material and/or for the joining of the other material with the second material.

BRIEF DESCRIPTION OF THE FIGURES

Other advantages, features, characteristics and aspects of the present invention follow from the claims and the following description of preferred embodiments based on the drawing.

DETAILED DESCRIPTION

In the partially not-true-to-scale, merely schematic figures, the same reference symbols are used for same or similar parts, with corresponding or comparable characteristics and advantages being achieved even if a repeated description is omitted.

Figure 1:
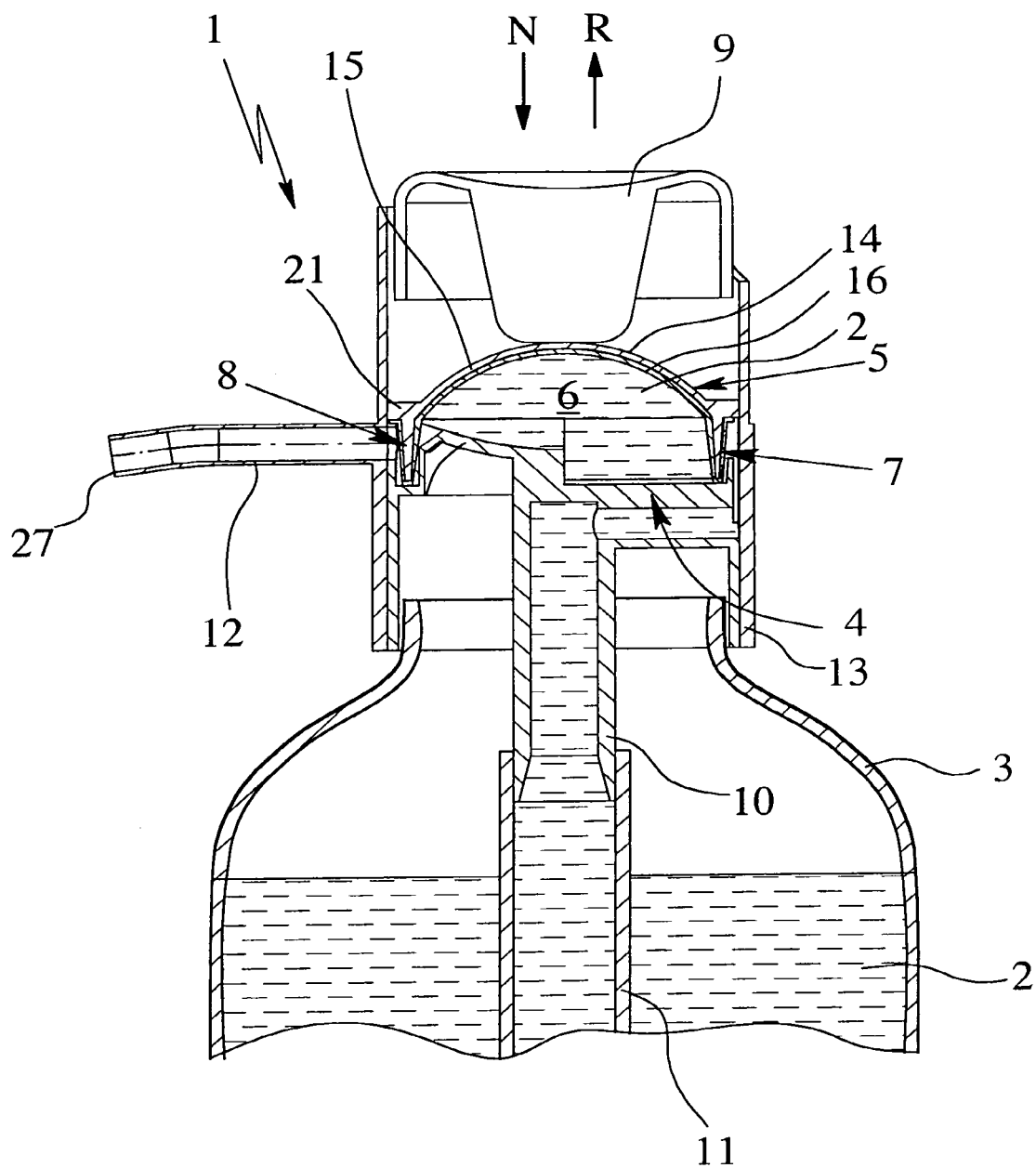
FIG. 1 shows a schematic section of a proposed dispensing device according to a first embodiment.

FIG. 1 shows a first embodiment of a proposed dispensing device 1 for the dispensing of a preferably cosmetic liquid 2 in the sense named at the outset. The liquid 2 can be substantially more viscous than water or optionally even pasty. Particularly, it can form a foam or gel. The liquid 2 can also contain gas in liquid and/or another form.

A container 3 or other reservoir for the provision of the liquid 2 is preferably allocated to a container 3 on which the dispensing device 1 is removably attached as needed. In this manner, it is possible for an exchange of the container 3 and/or a refilling of the liquid 2 to occur. Alternatively, the dispensing device 1 can also form a reservoir for the liquid 2 or the container itself.

The dispensing device 1 has a preferably a first housing part, component or lower part 4 and another component 5, particularly an upper part. The terms "lower part" and "upper part" correspond in the representation according to FIG. 1 to the preferred arrangement or alignment of the dispensing device 1 during normal use. This is not necessarily the case, however. Accordingly, depending on the need, application, design and the like, the lower part 4 and the component or upper part 5 can also be configured or aligned in any spatial relationship to each other.

The lower part 4 is preferably designed to be rigid and/or a single piece, and is particularly injected from a suitable plastic.

The component 5 is preferably designed to be elastically deformable. The proposed design of the component 5 shall be explained in greater detail further below.

The dispensing device 1 has an accommodating or pump chamber 6 for the liquid 2 which is particularly formed or delimited exclusively from or between the component 5 and the lower part 4.

Preferably, the component 5 forms, optionally together with the lower part 4, an inlet valve 7 and/or a discharge valve 8. However, the valves 7, 8 can also be embodied separately. It is on the basis of the valves 7, 8 that the functionality of a pump is preferably made possible. The valves 7, 8 are preferably embodied as self-closing one-way valves.

When the pump chamber 6 is filled with liquid 2 as shown in FIG. 1, the volume of the pump chamber 6 can be made smaller through the deformation of the component 5, thus forcing liquid 2 from the pump chamber 6 and dispensing same. In particular, an optional actuating element 9 is preferably pressed manually in the direction of the arrow N for this purpose, thus pressing the component 5 down at least in areas. However, it is also possible, for example, for a user (not shown) to press directly on the component 5 to dispense liquid 2.

The displaced liquid 2 is delivered or dispensed via the discharge valve 8. In particular, the opening of the discharge valve 8 occurs automatically, preferably due to the pressure of the liquid and/or—or, optionally, additionally—due to a corresponding deformation of the component 5 during pressing down.

As a result of the inherent elasticity or the restorative force of the component 5, an automatic return according to arrow R to the original position shown in FIG. 1 then occurs, with new liquid 2 being taken up, particularly sucked, via the inlet valve 7 into the pump chamber 6. The opening of the inlet valve 7 during the return to the original position preferably occurs due to the negative pressure then present in the pump chamber 6. The discharge valve 8 remains closed during the return to the original position and renewed filling of the pump chamber 6, respectively.

The component 5 preferably has a section, annular here, which particularly forms the inlet valve 7 and/or the discharge valve 8.

The dispensing of liquid 2 through the dispensing device 1 occurs, in particular, in a non-atomized state via a delivery channel as or the like. In principle, however, an atomization of the liquid 2 is also possible by means of the dispensing device 1.

The dispensing device 1 preferably has a connection part 13 to hold the component 5 and, in particular, to connect the component 5 to the lower part 4. Particularly, the connection part 13 is substantially collar-shaped and/or rigid, at least in comparison to the component 5. Especially preferably, the connection part 13 is injected directly onto the component 5, particularly by means of so-called "bi-injection," i.e. injection of another material against a first material. Especially preferably, the component 5 is circumferentially mounted or held on the periphery of the connection part 13.

The lower part 4 is preferably inserted into the connection part 13, for example glued, clamped, or latched in.

However, it is also possible for the component 5 to be joined only directly with the lower part 4 or held preferably in an at least substantially self-sealing and/or self-holding manner on the lower part 4. As needed, undercut sections, notches or the like can additionally engage each other as well.

In the depicted example, the lower part 4 is preferably rigid or relatively solid, at least in comparison to the comparatively relatively soft, flexible and/or elastic component 5.

In the depicted example, the component 5 forms a preferably continuous, particularly arched wall 14 at least in the area of the pump chamber 6. The wall 14 forms, particularly, the primary deformable area of the component 5. In the depicted example, the component 5 or the wall 14 is preferably dome-shaped or spherical, particularly hemispherical. However, other shapes and/or other uses of the component 5 are also possible, for example for container walls, valve parts, spring sections or the like, depending on the individual application.

Up to now, the lower part 4 and the component 5 have each been manufactured in one piece from a single material. According to the proposed invention, however, the lower part 4 and/or the component 5 are modified particularly as explained in the following and/or disclosed in the claims.

For the sake of example, the preferred construction of the component 5 is dealt with in greater detail. The same applies, however, to the lower part 4 and/or other parts of the dispensing device 1 as well.

The wall 14 consists of a first material 15. Preferably, the component 5 consists at least substantially of this first material, particularly its other sections or areas as well such as valve flaps, supports, holding sections, flange sections, reinforcements, or the like.

The component 5 is preferably injection molded. The first material 15 is preferably a plastic, particularly an elastomer and/or a thermoplast. However, in principle it can also be another material. This is especially true if the component 5 does not (only) form the wall 14 for the pump chamber 6 or another pump part, but rather another component of the dispensing device 1.

The first material 15 is preferably an elastomer, rubber or other thermoplast. TPE (thermoplastic elastomer), TPV, and TEEE (thermoplastic elastomers with ether and ester groups), are preferably used, and TPU (thermoplastic urethane) is also especially preferably used.

According to the proposal, the component 5 is provided with or covered by a second material 16 particularly in areas, preferably at least in the area of the pump chamber 6 or the wall 14 or in other areas coming in contact with the liquid 2 and/or, alternatively, in areas which are joined to another material or component.

Preferably, the second material 16 is also an elastomer and/or a thermoplast, but it can also be another material as needed. Especially preferably, the second material 16 is a food-safe plastic and/or a plastic which is insensitive or resistant to the liquid 2 such as a polyolefin, particularly PP (polypropylene) or PE (polyethylene), especially preferably UPE, TPEE, TEEE, or TPU.

The first material 15 and the second material 16 are preferably different, so they have at least different characteristics and/or at least different compositions. By combining different materials, the desired characteristics of the component 5 can be achieved much more easily, for example in the area of the wall 14 or in the elastically deformable area for the pumping.

In the first embodiment, the first material 15 of the component 5 is preferably completely covered by the second material 16 in the area which is or comes into contact with the liquid 2. Particularly, a continuous covering or layer is thus formed from the second material 16.

The second material 16 or the layer is preferably solid, insoluble and/or joined over its entire surface with the first material 15. For this purpose, the second material 16 is particularly injected onto the first material 15 by means of so-called "bi-injection," with the first material having or possibly forming an at least substantially smooth or rough surface or a surface provided with undercuts, recesses, holes or the like.

The first material 15 or its surface is preferably pretreated at least in areas prior to the squirting out of the second material 16. Particularly, pretreatment is done by means of plasma treatment and/or irradiation. Through the pretreatment, radicals can be formed and/or polymer chains broken open and/or a better bond (or one at all) made possible between the first material 15 and the second material 16.

As necessary, the pretreatment can be done only in areas. In the depicted example, the pretreatment is preferably done at least over the entire surface of the wall 14 in order to achieve a joining over the entire surface with the second material 16 or the layer formed therefrom.

If the second material 16 is injected on, against or upon the first material 15 with pretreated surface, the second material 16 is able to join with the first material 15—particularly only in the pretreated area—particularly in a chemical and/or solid and/or tight and/or insoluble manner.

During "bi-injection," the injection of the second material 16 occurs particularly in the same injection mold in which the component 5 or the wall 14 is manufactured. In particular, the removal of the component 5 is not necessary. This allows for especially simple manufacture.

Alternatively or in addition, the second material 16 can, in principle, be joined with the component 5 or the wall 14 through gluing, welding or in another suitable fashion, particularly through a positive or nonpositive connection, for example through clamping.

Alternatively, the second material 16 or the material layer can also be held only in areas with the first material 15 or together with same, for example in edge or peripheral areas.

Alternatively or in addition to the preferred chemical joining of the two materials 15, 16 through pretreatment and subsequent injection—particularly after prior pretreatment—a mechanical, particularly a nonpositive or positive, connection is also possible.

The liquid-side or internal arrangement of the second material 16 or covering of the first material 15 protects the first material 15 against chemical influences, particularly by the liquid 2 and/or the liquid 2 from chemical influences of the first material 15, or other interactions. In this manner, it is possible, for example, to use materials which are not food-safe and/or not resistant to the liquid 2 as the first material 15 in order to achieve, for example, a cost-effective manufacture and/or certain mechanical or other characteristics. The second material 16 can then ensure, in particular, the desired food-safety or resistance to the liquid 2. Preferably, the second material 16 in or coming in contact with the pump chamber 6 or the liquid 2 is food-safe and/or chemically resistant at least to a sufficient extent.

Alternatively or in addition, the covering formed by the second material 16 can also prevent the escaping of softeners from the first material 15 in order to ensure desired material characteristics of the first material 15 in this manner.

In the depicted example, the second material 16 covers the surface of the wall 14 or of the component 5 opposite the pump chamber 6. Particularly, the second material 16 or the layer or covering formed therefrom extends up to or even under another material or component which is resistant to the liquid 2 or is inert—in the depicted example, the lower part 4 or the connection part 13.

In addition or alternatively to the shielding of the first material 15, the second material 16 can also serve to modify the elastic characteristics or other characteristics of the component 5, particularly if the second material 16 forms a bond with the first material 15 or component 5.

It should be noted that, in the present invention, elastic characteristics and return to the original position, in particular the deformability of the component 5 in general as well, are to be understood as an essential characteristic associated therewith.

However, the present invention is not limited to elastic or flexible, which is to say deformable components. Rather, the covering by the second material 16 can also be used in any type of component of a dispensing device 1 according to the present invention, particularly in order to prevent direct contact between liquid 2 and material, to influence the mechanical characteristics, or to form a valve, for example.

In the following, other embodiments are explained, though only essential differences are emphasized. The foregoing remarks and explanations therefore apply accordingly or at least in a supplementary fashion.

Figure 2:
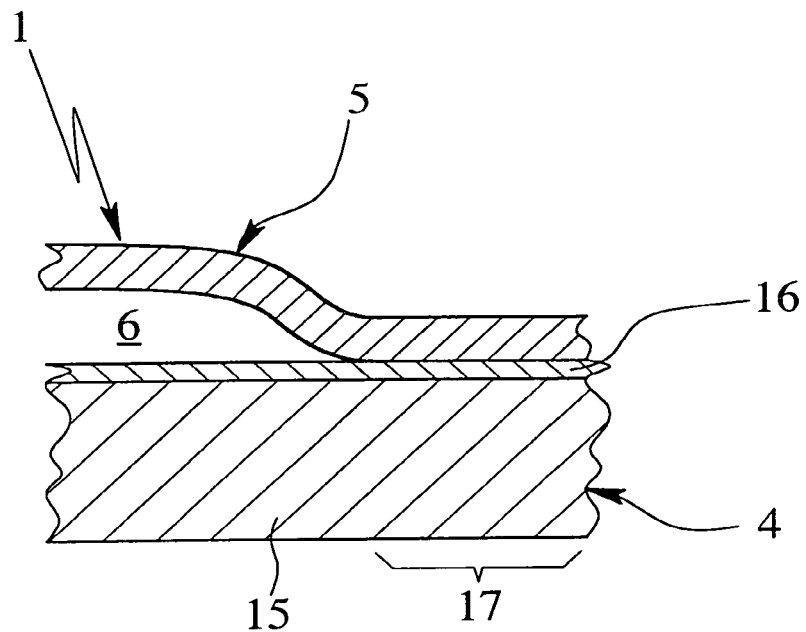
FIG. 2 shows a schematic partial section of a proposed dispensing device according to a second embodiment.
Figure 3:
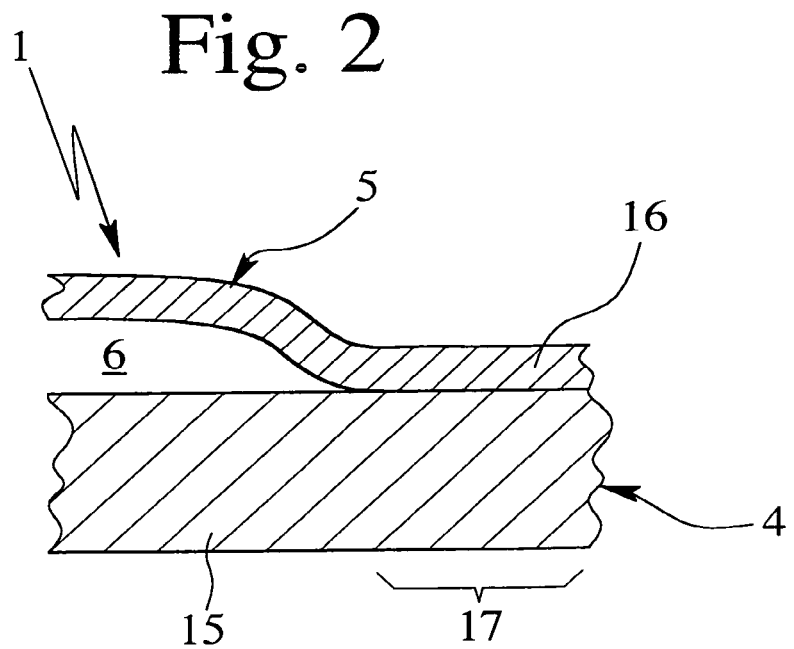
FIG. 3 shows a schematic partial section of a proposed dispensing device according to a third embodiment.

FIG. 2 shows a second embodiment in a partial, schematic and not-true-to-scale section. Here, a first part, for example the lower part 4, a section of wall or the like is made from the first material 15. The surface and/or other area exposed to the liquid 2, particularly an area of the surface of the first material 15 provided for the joining with another component, is covered with the second material 16 in whole or in part—particularly over the entire surface. Particularly, in this case, the second material 16 forms an intermediate layer to another component—to the component 5 according to the first embodiment in the depicted example according to FIG. 2.

Particularly, the other material which is joined, particularly superficially, with the second material 16 on the side facing away from the first material 15, preferably flat side, can also consist of the same material or similar material or, preferably, of a polyolefin, particularly polypropylene or polyethylene, especially preferably LLPE, TPEE or TEEE.

In the second embodiment, the second material 16 particularly protects the first material 15 or the component 4 from direct contact with the liquid 2. Accordingly, particularly suitable materials with particularly desired mechanical characteristics or other characteristics can be used, in turn, for the first material 15 even if these materials are not food-safe and/or resistant to the liquid 2.

Alternatively or in addition, the second material 16 or the intermediate layer formed thereby serves here as an adhesion promoter in order to be able to join the other component 5 with the first component or lower part 4. In this manner, especially favorable combinations of materials can be used here, particularly in order to improve the mechanical characteristics or other characteristics.

As already mentioned, one aspect consists in that, in order to improve the connectability of two materials, particularly plastics, a material or its surface is pretreated by means of plasma treatment and/or irradiation, for example using electrons, positrons, microwaves, UV radiation, X-rays, laser light, or the like in order to enable an especially good adhesion of the other material on the first, pretreated material, or to make adhesion possible at all. Particularly, in this manner, even materials which cannot normally be joined together such as TPU on the one hand and PE or PP on the other hand can also be joined together. In particular, it becomes possible as a result of this to inject the other material directly against the pretreated material, particularly by means of the aforementioned "bi-injection" or the like in order to immediately achieve a solid bond between the two materials.

Particularly, the aforementioned pretreatment can also be used in any embodiment to produce a good or solid or exclusive bond between component 4 and the second material 16 and/or to produce a solid bond between the second material 16 or the intermediate layer and the other material or component 5 or the like.

According to an especially preferred variant, the pretreatment occurs only in a limited area 17. For example, the area 17 can be determined using a screen, mask or the like, so that the desired plasma treatment, irradiation or the like occurs for the purpose of pretreatment only in the desired area 17.

In the second embodiment, the side of the second material 16 facing away from the first material 15 or lower part 4 is only pretreated in the schematically indicated surface area 17, for example. The other material or component 5 or the like then preferably only adheres in this pretreated area 17. In particular, it is possible and provided for to inject or otherwise apply the other material directly and over the entire surface against the second material 16. Due to the pretreatment having been applied only in areas, an adhesion or bond then preferably occurs only in the pretreated area 17. In order to form the pump chamber 6, for instance, the other component 5 can therefore then detach again, for example be lifted off or the like, from the second material 16 in the non-pretreated area 17, particularly in order to form the pump chamber 6, a channel for the liquid 2 or a product formed therefrom such as a foam, or a valve, a discharge channel, or the like. In this manner, manufacture is made very simple and the determination of desired areas of bonding 17 is made possible in a simple manner. The same applies to the joining of the second material 16 with the first material 15.

The third embodiment corresponds substantially to the second embodiment, with the covering or intermediate layer made of the second material 16 having been omitted. In the third embodiment as well, a joining of the component 5 or second material 16 with the first material 15 or lower part 4 or the like is made possible again by means of a pretreatment in the aforementioned sense. Particularly, any types of suitable plastic can be combined with each other here.

In the third embodiment, a preferably self-collapsing discharge channel or other chamber for liquid 2 is formed preferably between the two components 4 and 5. Accordingly, the components 4 and 5 preferably consist of materials which are resistant to the liquid 2 and/or food-safe.

In the third embodiment, the pretreatment can again be applied as necessary only in a desired area 17 or the like in order to achieve a joining or adhesion of the component 5 or second material 16 with the first component 4, first material 15 or the like only in this area 17.

The pretreatment over areas as explained in the foregoing can also be used for other purposes in the proposed dispensing device 1 or other dispensing devices or the like. Preferred examples follow.

Figure 4:
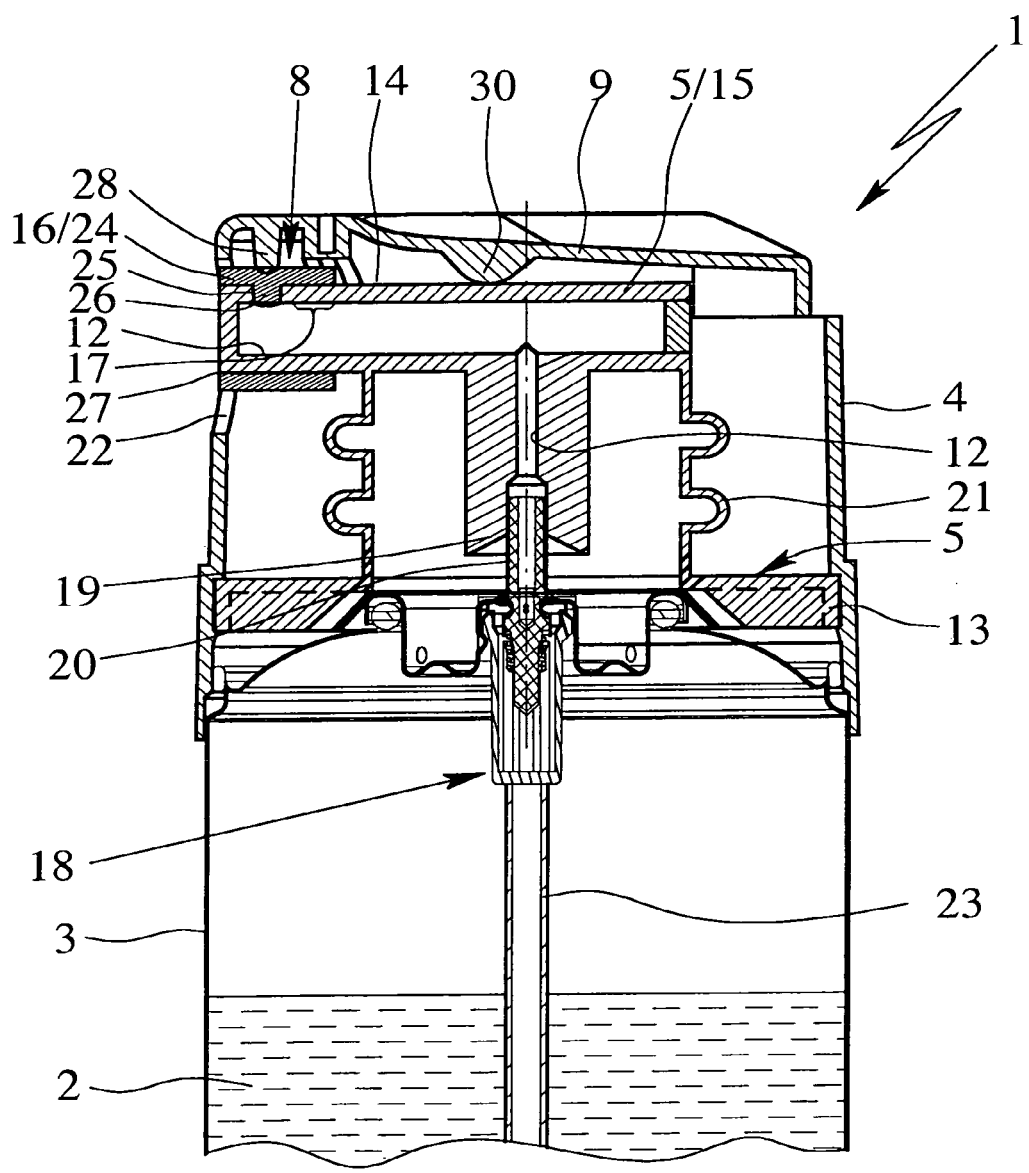
FIG. 4 shows a schematic section of a proposed dispensing device according to a fourth embodiment.

FIG. 4 shows, in schematic section, a fourth embodiment of the proposed dispensing device 1, which is embodied here as a dispenser head for dispensing a liquid 2 in the sense named at the outset.

Particularly, the dispensing device 1 is designed to dispense the liquid 2 in a non-spraying manner. Particularly, a dispensing of the liquid 2 occurs as a foam, preferably as shaving foam or the like. For this purpose, the liquid 2 is particularly embodied such that it is self-foaming and/or foams upon dispensing.

However, in principle, the liquid 2 can also be dispensed in a non-foamed state and, in particular, can even be non-foaming. Moreover, it is also possible for the liquid 2 to foam only very slightly, so that the foaming increases the volume only somewhat but a liquid or pasty consistency is maintained substantially upon dispensing.

It should be noted that, in principle, in place of the delivery of the liquid 2 as foam indicated for the sake of example, any other delivery of the liquid 2—optionally even as a pasty mass, as gel, as drops, as a stream or as spray fog—is worthy of consideration.

The dispensing device 1 is preferably provided or joined with a reservoir, particularly a container 3 for the liquid 2 to be dispensed. The reservoir can thus form a part of the dispensing device 1 or can be connected to same.

In the depicted example, the reservoir is embodied as a preferably rigid container 3, particularly as a pressurized container. Particularly, the container 3 has an oblong and/or cylindrical and/or rigid design—especially preferably that of a metallic can—for the liquid 2.

The liquid 2 in the reservoir can either be placed under pressure or is under pressure. Particularly, the container 3 or the liquid 2 contains a suitable propellant, preferably a volatile and/or flammable propellant, compressed gas and/or carbon dioxide.

Especially preferably, the container 3 has on its front face a delivery valve 18 to which the dispensing device 1 or the dispensing head formed therefrom is connected or can be connected.

The dispensing device 1 has a delivery channel 12 with an allocated discharge valve 8. Especially preferably, the discharge valve 8 is arranged at the delivery end 27 of the delivery channel 12 or the dispensing device 1.

In the depicted example, the dispensing device 1 preferably has a housing part 4 which can be connected to the reservoir or container 3, especially preferably placed thereupon by clamping or snapping thereon.

Furthermore, the dispensing device 1 has a component 5 which is preferably inserted into the housing part 4 and forms the delivery channel 12 and can be connected to the delivery valve 18. In the depicted example, the component 5 is provided with a connection part 19, particularly for the pluggable connection with the delivery valve 18 or a connection element 20 of the delivery valve 18.

In the depicted example, the two parts 4, 5 are embodied as separate parts. Particularly, the component 5 is inserted or latched into the housing part 4 or connected therewith in another suitable manner, particularly via the connection part 13. However, the two components 4, 5 can also be embodied in a single piece.

Especially preferably, no nozzle, no additional channel or the like is connected to the discharge valve 8 or the delivery channel 12. Rather, they preferably open "into the open air." In this manner, the liquid 2 is able to be taken up and used, preferably directly, by a user (not shown) upon dispensing from the delivery channel 12 or delivery valve 18.

The discharge valve 8 is preferably embodied such that it opens depending on the existing pressure of the liquid, particularly when a predetermined minimum pressure is exceeded. Especially preferably, this minimum pressure is higher than a foaming pressure of the preferably self-foaming liquid 2. On the other hand, the delivery pressure (with the delivery valve 18 open) and the resulting pressure of the liquid is then higher, in turn, than the minimum pressure, so that the discharge valve 8 opens as well for the desired delivery of liquid and production or dispensing of foam.

Moreover, the dispensing device 1 preferably has an actuating element 9 which is formed in the depicted example by the housing part 4 or is formed thereon, but can also be embodied as a separate part. Other constructive solutions are also possible, however.

The opening of the delivery valve 18 preferably occurs through the pressing-down of the dispensing device 1 or the component 5 or the actuating element 9. For example, the actuating element 9 can act via an actuating part 30 on the component 5 for this purpose.

The component 5 has, for example, a section 21 which is elastic in the manner of a spring, so that the component 5 can be displaced with its connection part 19 toward the delivery valve 18 and the delivery valve 18 can be opened as a result.

In the depicted example, the springing section 21 is especially preferably embodied in the manner of a bellows and/or is preferably spring-elastic only in the linear direction, particularly the direction of actuation of the delivery valve 18. However, other constructive solutions are also possible.

In the depicted example, the returning of the component 5 to the original position occurs exclusively as a result of the spring forces of the springing section 21. In addition or alternatively, however, a return or closing spring or another constructive solution (not shown) can also be used.

In the depicted example, the actuating element 9 is preferably hinged or tiltable in order to open the delivery valve 18 via the component 5, which can preferably only move linearly here.

The delivery channel 12 and/or the discharge valve 8 can preferably also be displaced, particularly pressed down, with the component 5. In the depicted example, the housing part 4 has a corresponding hole 22 in the outer wall in order to enable the aforementioned, preferably also linear, movement of the delivery end 27. However, other constructive solutions are possible here as well.

When the delivery valve 18 is opened, the liquid 2 in the reservoir or container 3 and preferably under pressure is able to flow via a riser 23 and the opened delivery valve 18 into the delivery channel 12. Particularly, an at least initial foaming of the liquid 2 then occurs in the delivery channel 12. As necessary, a foam formation device, not shown, can also be provided (additionally or alternatively) for this purpose. For example, the liquid 2 or the foam can be foamed (additionally or alternatively) by feeding through a screen (not shown) and/or through the addition of gas or air.

As a result of the pressure of the liquid or delivery pressure existing or in place when the delivery valve 18 is open, the discharge valve 8 preferably opens automatically.

The liquid 2 is able to escape to the outside or into the open through the open discharge valve 8 and, especially preferably, foam up or foam up further or form a gel or other product or be discharged in liquid, pasty or other form.

When let loose, the delivery valve 18 preferably closes again on its own. However, the delivery valve 18 can also be a dosing valve, for example, or other valve device.

The dispensing of liquid or production of foam ends when the pressure of the liquid or delivery pressure in the delivery channel 12 falls again below the minimum pressure, so that the discharge valve 8 closes. This is then the case when the delivery valve 18 closes again, particularly as a result of the release or automatic return to position of the dispensing head or actuating element 9. The closed or closing discharge valve 8 then prevents liquid 2 or foam or the like still present in the delivery channel 12 from coming out subsequently or foaming out in an undesired manner.

The discharge valve 8 preferably has a component 24 which is preferably moveable at least in part or in areas and/or, particularly, forms a valve element. In particular, the valve element 24 is able to seal a discharge opening 25 of the delivery channel 12.

The discharge opening 25 preferably ends in a surface or the wall 14 of the component 5 or delivery channel 12, which is or can be covered by the valve element 24 at least in the area of the discharge opening 25.

In the depicted example, the surface or wall 14 is preferably arched or bent or convex. Especially preferably, it is an annular surface. Accordingly, the component 5 or delivery channel 12 is preferably hollow and cylindrical or cylindrical or annular at least in the area of the discharge opening 25.

The valve element 24 is preferably adapted to the curvature of the surface and encloses the delivery channel 12 or the component 5 or the surface in the area of the discharge opening 25, preferably in part and particularly in whole—in an annular manner in the depicted example. However, other constructions are also possible here.

Here, the component 5 is manufactured from the first material 15, particularly a relatively rigid plastic material.

The valve element 24 is manufactured from a second material which is preferably elastically deformable and, particularly, softer than the first material 15.

The valve element 24 is preferable injection-molded, preferably injected by means of "bi-injection" directly against the component 5. This renders the manufacture very simple.

The valve element 24 can protrude with a projection 26 into the discharge opening 25, as shown in the depicted example. Particularly, the projection 26 can very easily be produced or formed during the preferred injection of the component 24.

Under corresponding liquid pressure, the discharge valve 8 opens as a result of the valve element 24 lifting up or widening radially or expanding at least in part from the component 5. Accordingly, the optional projection 26, particularly, can then be displaced at least somewhat out of the discharge opening 24 radially toward the outside in order to thereby enable an exiting of the liquid 2 from the delivery channel 12 through the discharge opening 25 and then axially forward to the free end of the component 5 or delivery end 27.

Especially preferably, the valve element 24 is joined at least in areas solidly and/or tightly with the surface of the component 5 or the first material 15. The bond is made possible, particularly, by the aforementioned pretreatment of the surface or wall 14 in the area 17 in which a solid bond is desired prior to the injection of the second material 16.

Especially preferably, the pretreatment is done by means of plasma treatment and/or irradiation. In this way, the two materials 15 and 16, such as PE or PP on the one hand [and] TPU on the other hand, which could otherwise not be solidly joined together, can be joined solidly, particularly chemically and/or tightly with each other in the desired area through the subsequent injection of the second material 16.

According to a preferred variant of an embodiment, the joining area 17, in which the aforementioned pretreatment or solid joining of the valve element 24 with the component 5 occurs, is preferably of annular design and/or arranged only on one side of the discharge opening 25 opposite the delivery end 27.

Surprisingly, it has turned out and an aspect of the present invention consists in that more or less a "virtual" discharge channel is formed between the two materials 15, 16 or components 5, 24 lying flush against each other which opens only under the corresponding liquid pressure and closes again automatically and, particularly, performs a valve function and/or is very effectively able to prevent the undesired subsequent flowing or foaming.

According to a variant of an embodiment that is not shown, the joining area 17 can also extend laterally beside the discharge opening 25 or axially toward the delivery end 27, particularly it can enclose the discharge opening 25 in a U-shape, with the open end then ending at the delivery end 27. In this manner, the "virtual" discharge channel can be delimited particularly as needed in the lengthwise direction or—expressed in another way—an especially defined dispensing behavior can be ensured in a commensurately delimited peripheral area or surface area between the component 5 and valve element 24.

According to another aspect, the discharge valve 8 or its valve element 24 is (additionally) pressed or pretensioned by a stop 28 into the closed position—i.e. here against the discharge opening 25. In the depicted example, the stop 28 is preferably arranged, particularly formed, on the housing side or at the housing part 4 and/or is immobile or stationary.

In the depicted closed state, the component 5 or the delivery channel 12 is in the upper position, so that the stop 28 presses directly on the valve element 24 on the side opposite the discharge opening 25 and thus (additionally) holds the discharge valve 8 closed.

A special advantage of the discharge valve 8 is that, besides avoiding a subsequent exiting of the liquid 2, particularly a subsequent foaming, cleaning is also made very easy for the user, since the discharge valve 8 preferably forms a clean or easy-to-clean delivery end 27.

In the depicted example, the delivery of liquid preferably occurs substantially crossways, particularly perpendicularly, to the direction in which the delivery valve 18 is pressed down or opened and/or at least substantially horizontally or crossways to the longitudinal direction of the container 3.

Moreover, it should be mentioned that, preferably, no other device forming the dispensed liquid such as a nozzle, a channel or the like adjoins the delivery end 27. This does not rule out, however, that a shell-like expansion, housing-side recess or the like can also be provided to which the delivery end 27 leads.

Figure 5:
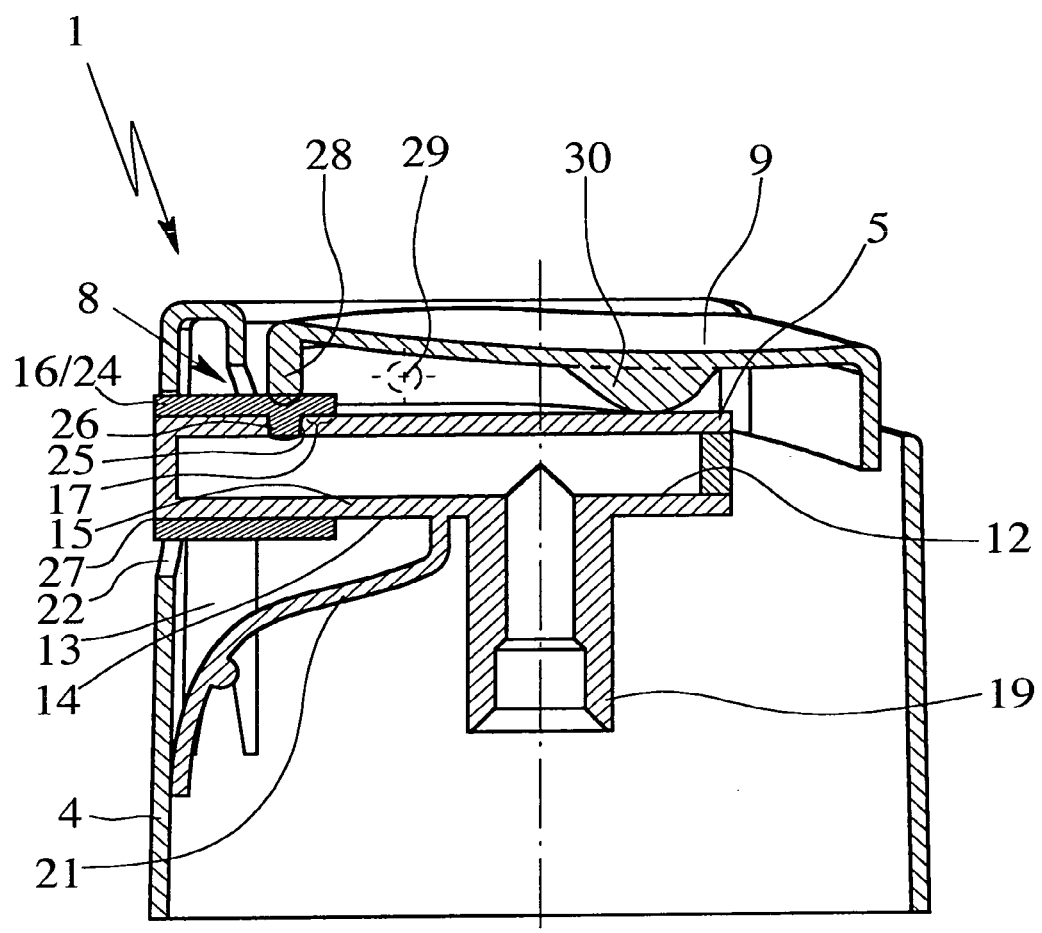
FIG. 5 shows a schematic section of a proposed dispensing device according to a fifth embodiment.

FIG. 5 shows a fifth embodiment of the proposed dispensing device 1, with the allocated container 3 with the delivery valve 18 not being depicted for the sake of simplicity.

The fifth embodiment is very similar to the fourth embodiment, so only substantial differences are explained in the following. In particular, the foregoing remarks and explanations apply to this and the other embodiments in a supplementary fashion and accordingly.

In the fifth embodiment, in order to actuate or open the delivery valve 18 not shown in FIG. 5, the component 5 with the delivery channel 12 can be tipped or swiveled from the shown initial position. Particularly, the section 21 is not embodied in the manner of a bellows here as in the fourth embodiment, but rather in the manner of an arm, for example, that is guided laterally to the housing part 4.

In the fifth embodiment, the stop 28 is not stationary, but rather moveable. Particularly, the stop 28 is fixed to the actuating element 9.

The actuating element 9 can be swiveled or tipped on a swivel axis 29 which runs preferably horizontally or, in the representation per FIG. 5, crossways to the drawing level. The swivel axis 29 preferably lies on a level between the stop 28 on the one hand and the actuating section 30 acting on the component 5 on the other hand. Accordingly, upon actuation or pressing down of the actuating element 9 from the position shown in FIG. 5, the actuating section 30 is moved downward and the stop 28 upward or opposite. Accordingly, the discharge valve 8 is able to open unhindered even if the component 5 or the discharge valve 8 is not moved downward or away from the stop 28 when the dispensing device 1 is actuated, or only relatively little.

Figure 6:
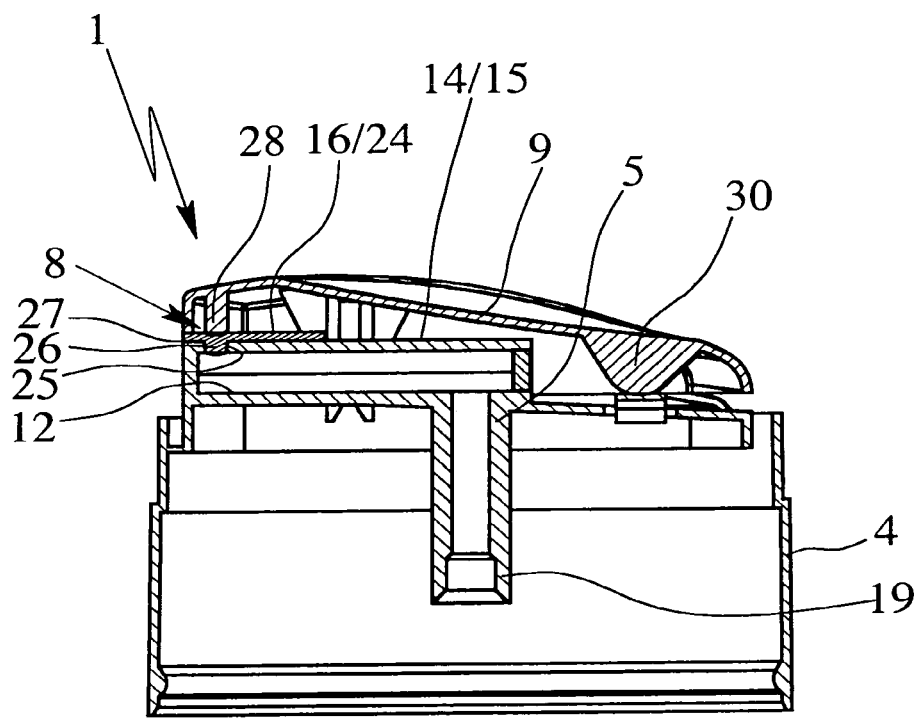
FIG. 6 shows a schematic section of a proposed dispensing device according to a sixth embodiment.
Figure 7:
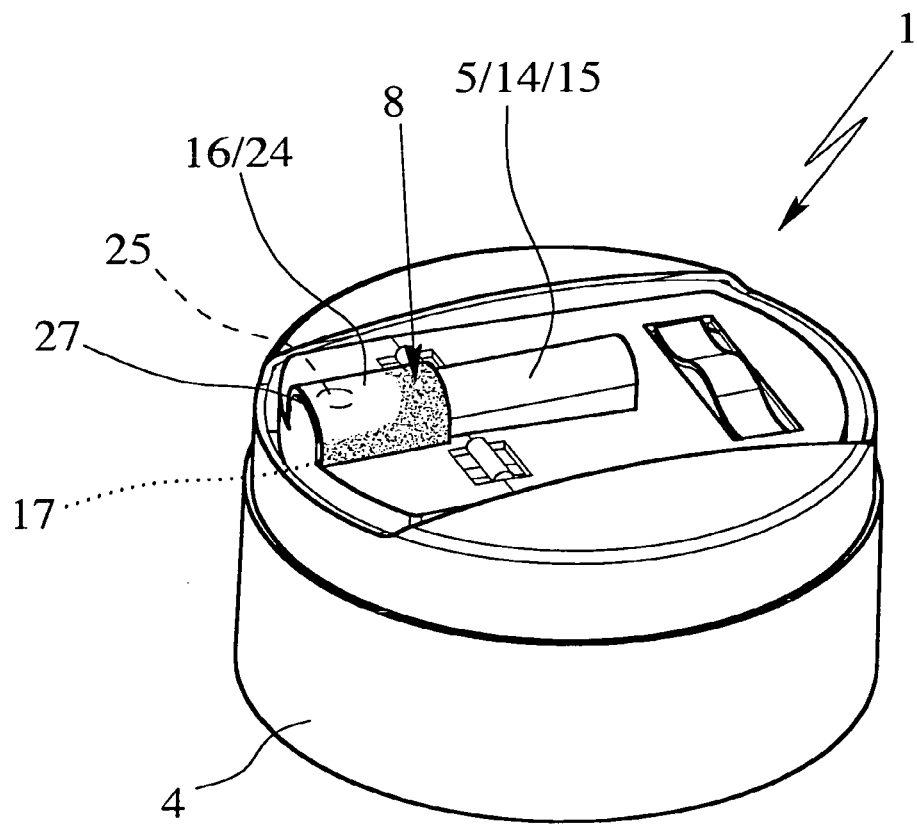
FIG. 7 shows a perspective view of the dispensing device according to FIG. 6.

FIG. 6 shows, in a schematic section, a sixth embodiment which is very similar to the fifth embodiment. FIG. 7 shows a perspective view of the dispensing device 1 according to the sixth embodiment.

The stop 28 is designed to be stationary at least for the most part or is substantially immobile.

In the sixth embodiment, the component or valve element 24 is not annular or hollow and cylindrical, but rather only arched and substantially semi-cylindrical. The component 24 is preferably joined solidly with the component 5, the wall 14 and/or first material 15 at least in the area of its longitudinal edges, preferably by means of a corresponding bond after appropriate pretreatment and/or by other means. Alternatively or in addition, the joining area 17 preferably extends over the wall 14 in the manner of a half-ring on the side of the discharge opening 25 facing away from the delivery end 27.

The joining of the component 5 and valve elements 24 in the desired area 17 (indicated with a dotted line in FIG. 7) is preferably done, in turn, by means of appropriate pretreatment, particularly only in areas, of the first material 15 and subsequent injection of the second material 16, so that a correspondingly solid bond is produced in the pretreated area 17 between the two materials 15, 16, as already addressed.

However, it is also possible in principle to join the valve element 24 in another suitable manner in the desired areas with the underlying surface or wall 14 or the component 5.

The rudimentary remark should be made that, in the present invention, the term "solid" bond is preferably to be understood in terms or a chemical and/or tight bond.

In the sixth embodiment, the housing part 4 and the component 5 are preferably embodied in one piece, with the housing part 4 holding the component 5 in a hinged manner.

In the depicted example, the actuating element 9 is preferably embodied as a separate part which is, particularly, placed on, stuck on, clamped on or snapped on. However, in principle, the actuating element 9 can also be formed onto the housing part 4 or component 5.

Figure 8:
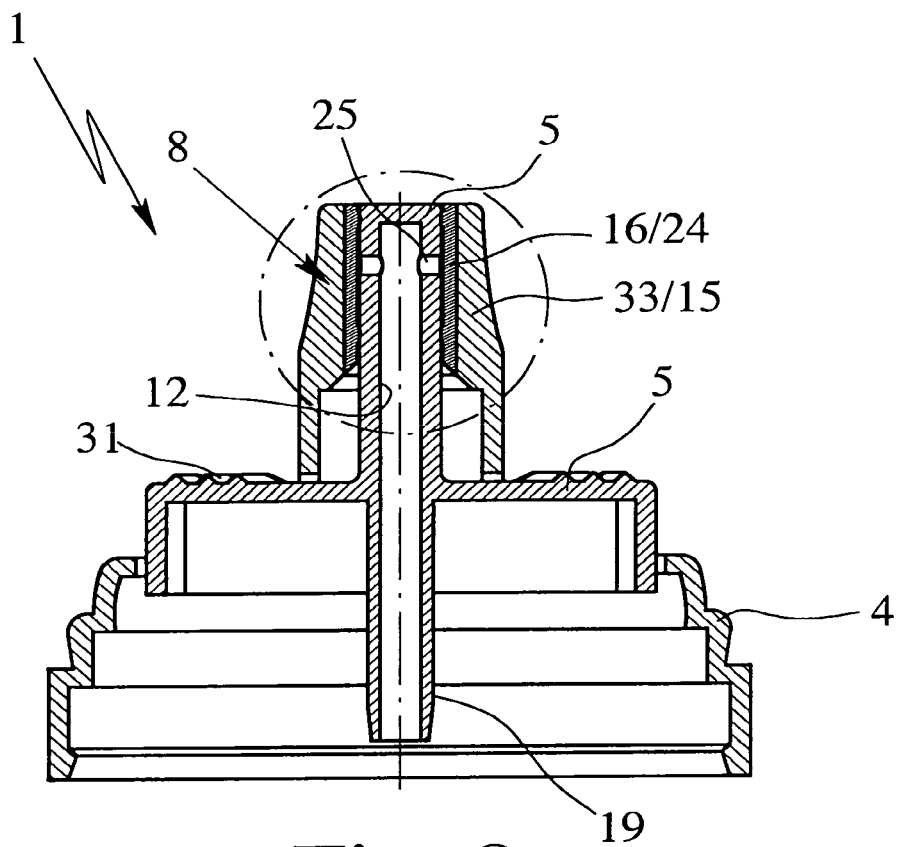
FIG. 8 shows a schematic section of a proposed dispensing device according to a seventh embodiment.
Figure 9:
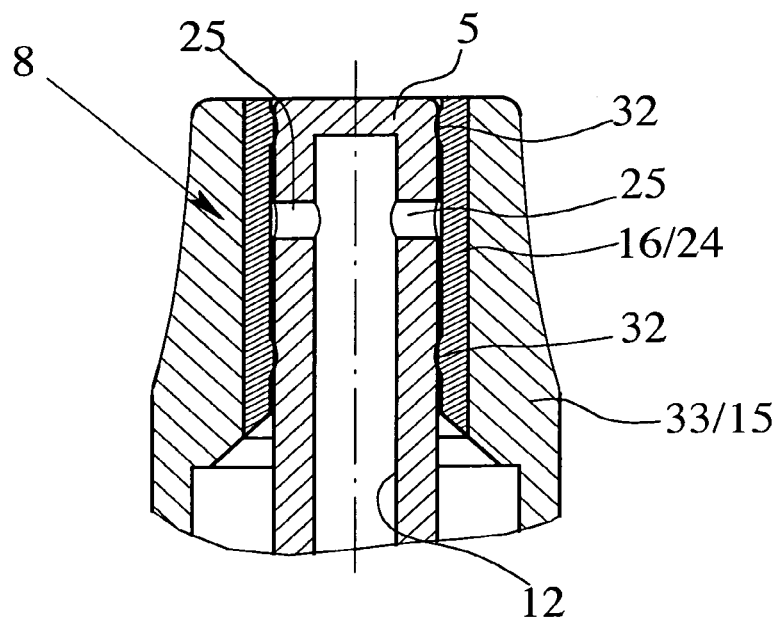
FIG. 9 shows a sectional enlargement of FIG. 8.

FIG. 8 shows, in a schematic view, a seventh embodiment of the proposed dispensing device 1. FIG. 9 shows a partial enlargement of the discharge valve 8.

In the seventh embodiment, in turn, a linear or translatory actuation of the allocated delivery valve 18 (not shown in FIGS. 8 and 9) preferably occurs, similarly to the fourth embodiment. Accordingly, only essential differences vis-à-vis the fourth embodiment are explained in the following.

In the seventh embodiment, the component 5 can preferably be actuated directly and manually. Particularly, at least a corresponding actuating area 31 is formed here.

The valve element 24, in turn, is preferably substantially hollow and cylindrical and, particularly, provided with at least one collar 32 on the inside, here with a collar 32 in the area of each of its two axial ends. The collars 32 serve to provide a specially defined, particularly annular and sealing arrangement of the valve element 24 on the component 5 or its wall 14. The discharge opening 25 or, in the depicted example, the two discharge openings 25 ends or end between the two collars 32.

In the depicted example, the valve element 24 is held or secured by a preferably hollow, cylindrical retention part 33. The retention part 33 encloses the valve element 24 particularly peripherally and/or over the entire axial length.

Especially preferably, the valve element 24 is injected into the retention part 33 or injected against the retention part 33. Again, this occurs preferably as a result of the surface of the retention part 33—in the depicted example, the hollow, cylindrical inner circumferential surface—being pretreated prior to injection, as already described above, in order to achieve a solid bond with the valve element 24.

The retention part 33 is then pushed up axially together with the valve element 24 onto the component 5 or the delivery channel 12. Depending on the adaptation or radial pretensioning of the valve elements 24 against the component 5 or its wall 14, a further fastening or fixing of the retention part 30 on the dispensing device 1 is no longer necessary. However, the retention part 33 can also be additionally joined with or secured to the dispensing device 1 in a suitable manner, for example through clamping or snapping.

To open the discharge valve 8, the valve element 24 can move out of the way radially to the outside in an elastic manner, especially in the area of its collar 32 toward the delivery end 27 (preferably, the retention part 33 is correspondingly radially removed), in order to make it possible to dispense the liquid 2 or the foam or the like formed therefrom.

Figure 10:
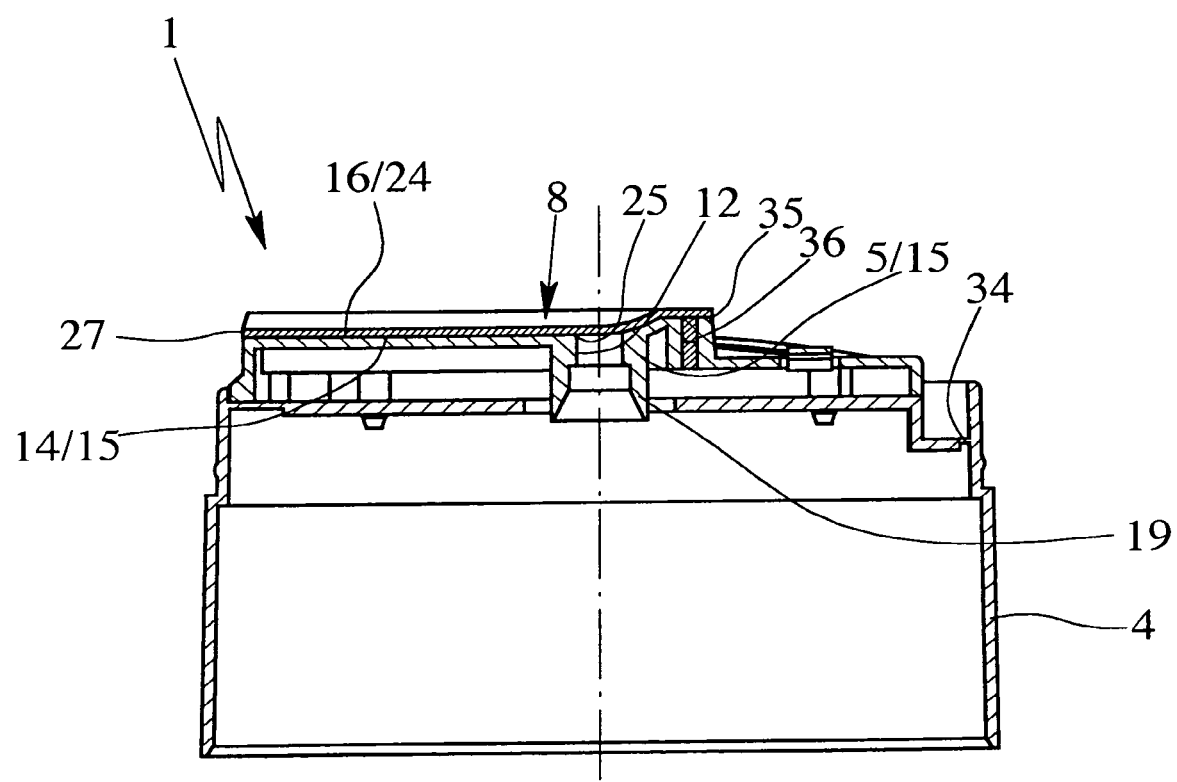
FIG. 10 shows a schematic section of a proposed dispensing device according to an eighth embodiment.
Figure 11:
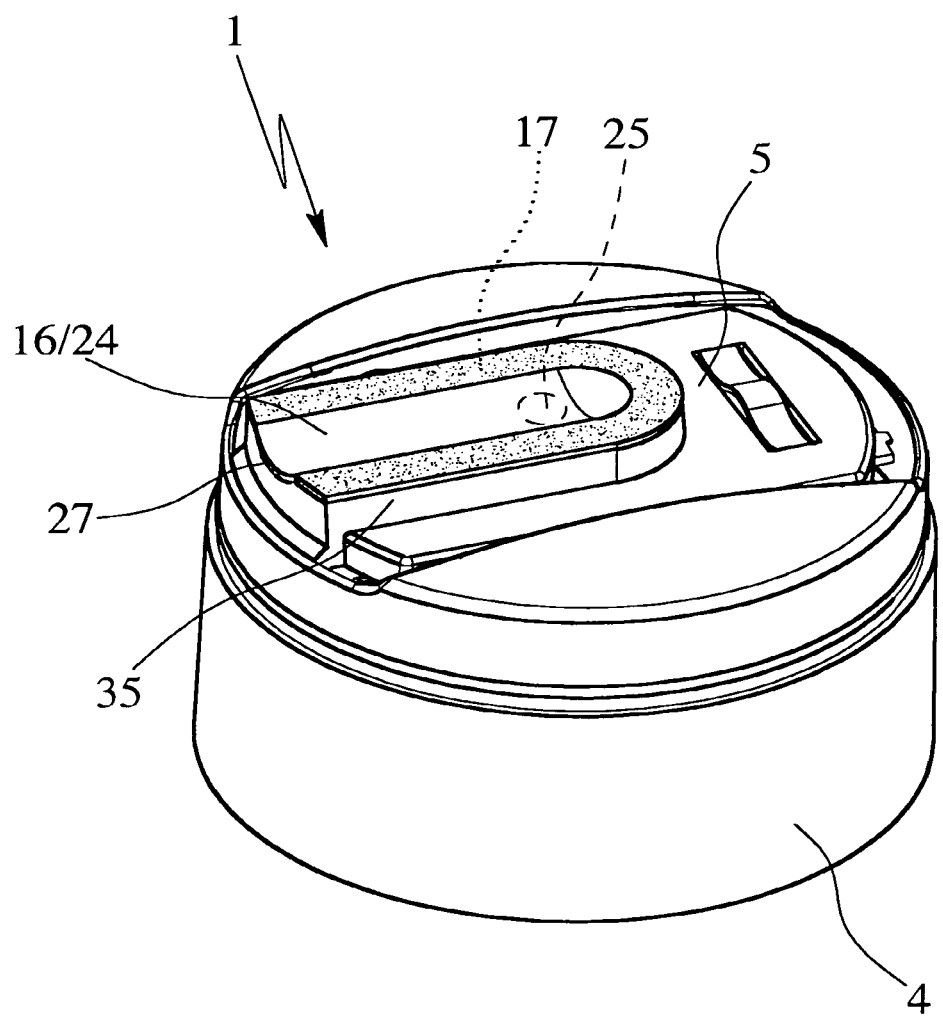
FIG. 11 shows a perspective view of the dispensing device according to FIG. 10.

FIG. 10 shows an eighth embodiment of the proposed dispensing device 1. FIG. 11 shows a perspective view of this dispensing device 1.

The eighth embodiment is very similar to the fifth and sixth embodiments with respect to the ability of the component 5 to swivel. The component 5 with the discharge valve 8 can be swiveled or tipped on a swivel axis 29 in the area of the discharge or delivery end 27 from the shown, non-actuated position downward to open the allocated delivery valve 18 (not shown). Here, upon initial actuation, the preferably provided predetermined breaking point 34, which is still suggested in FIG. 10, is particularly embodied as a narrow bridge, and facilitates the preferred one-piece manufacture of the housing part 4 and component 5, breaks.

In the eighth embodiment, the delivery channel 12 is axially open on the end side and/or not kinked. On its axial end it forms the discharge opening 25, which can be covered or sealed directly by the valve element 24.

The discharge opening 25 preferably ends in a groove-like or concave surface of the wall 14. Particularly, the discharge opening 25 opens in the area opposite the delivery end 27 of the end of an oblong recess formed by the component 5, with said recess being particularly enclosed by a preferably U-shaped, relatively elevated edge 35. The edge 35 runs with its two preferably parallel legs in the direction of discharge, i.e. toward the delivery end 27.

The valve element 24 is solidly and tightly joined with the component 5 at least in the area of the edge 35, as suggested schematically by the area 17 in FIG. 11. This can be done through corresponding engagement into a corresponding slit, a corresponding groove 36, a recess or the like—particularly in the area of the edge 35—as suggested in FIG. 10.

The second material 16 forming the valve element 24 is injected directly on, upon or against the component 5, especially preferably by means of "bi-injection" here, too, in the manner already explained.

In order to bond the valve element 24 with the component 5 or its wall 14 or the first material 15, a pretreatment is preferably performed again in the area 17 prior to the injection of the valve element 24 (indicated with a dotted line in FIG. 11) in which the solid bond between valve element 24 and component 5 is desired. Especially preferably, this occurs in the area of the edge 35 and/or in an area enclosing the discharge opening 25 at least substantially in a U shape.

As in the fourth, fifth and sixth embodiments, according to a preferred aspect, the valve element 24 preferably lies evenly and over its entire surface on the component 5 or its wall 14 along a "virtual" delivery channel starting from the discharge opening 25 toward the delivery end 27.

Only upon the dispensing of liquid is the valve element 24 lifted elastically along this virtual delivery channel from the component 5 or the wall 14 (this is possible since the second material 16 does not bond solidly with the first material 15 without the aforementioned pretreatment and since no pretreatment is performed at least in the area of the desired virtual delivery channel), hence releasing or opening the delivery channel.

Once the dispensing of liquid has been completed, the discharge valve 8 or valve element 24 preferably closes again automatically due to the elastic return forces.

Individual features and constructive solutions of the embodiments can also be combined with each other as desired and/or used in other dispensing devices.

LIST OF REFERENCE SYMBOLS

1 Dispensing device
2 Liquid
3 Container
4 Lower part/housing part
5 Component
6 Pump chamber
7 Inlet valve
8 Discharge valve
9 Actuating element
10 Connector
11 Suction hose
12 Delivery channel
13 Connection part
14 Wall (component)
15 First material
16 Second material
17 Area (pretreatment, bond)
18 Delivery valve
19 Connection part
20 Connection element
21 Section
22 Hole
23 Riser
24 Component/valve element
25 Discharge opening
26 Projection
27 Delivery end
28 Stop
29 Swivel joint
30 Actuating section
31 Actuating area
32 Collar
33 Retention part
34 Predetermined breaking point
35 Edge
36 Groove

The invention claimed is:

1. A dispensing device, comprising:
a pressurized container comprising a container valve;
a housing part connected to the container; and
a component forming an outlet valve that is latched into the housing part,
wherein the component including the outlet valve is a prefabricated part that is a separate part from the housing part,
wherein the outlet valve comprises an integral or tube-like connection part extending transverse to a dispensing direction of the dispensing device,
wherein the outlet valve is mechanically and fluidically connected to the container valve in a pluggable manner by means of the connection part; and
a swivelable actuating element being a separate part from the housing part and the component,
wherein the actuating element is snapped onto the housing part or the component and tiltably held by the housing part,
wherein the component or outlet valve is hingedly and depressably held by the housing part so that the container valve is opened when actuating the dispensing device by swiveling the actuating element downwards on a swivel axis, and
wherein the swivel axis of the actuating element lies between a stop portion of the actuating element and an actuating section of the actuating element.

2. The dispensing device of claim 1, wherein the component or outlet valve is tiltable downwards when actuating the dispensing device.

3. The dispensing device of claim 1, wherein the component or outlet valve extends radially within the housing part.

4. The dispensing device of claim 1, wherein an elastically deformable valve element is fixed to the component to form the outlet valve.

5. The dispensing device of claim 1, wherein the outlet valve is at least essentially flat and the connection part extends transversally thereto.

6. The dispensing device of claim 1, wherein the actuating element comprises the actuating section for mechanically depressing the component, outlet valve or connection part when actuating the dispensing device.

7. The dispensing device of claim 1, wherein the actuating element forms a cap and covers the component.

8. The dispensing device of claim 1, wherein the actuating element comprises the stop portion for closing the outlet valve.

9. The dispensing device of claim 1, wherein the outlet valve opens directly into the environment.

10. A method for manufacturing a dispensing device for dispensing a liquid, comprising:
providing a housing part connectable to a pressurized container;
providing a component that is a separate part from the housing part and tiltably held by the housing part, the component comprising an integral connection part, the connection part extending transverse to a dispensing direction of the dispensing device;
providing an actuating element connectable to the housing part, wherein the actuating element is a separate part from the housing part and the component;
injecting a valve element to the component so that the valve element is solidly bonded in areas with the component to form an outlet valve;
latching the component to the housing part;
clamping or snapping the actuating element onto the housing part;
connecting the housing part to a container in order to plug the integral connection part of the component to a container valve of the container; and
swiveling the actuating element downwards on a swivel axis, the swivel axis located between a stop portion of the actuating element and an actuating section of the actuating element of dispensing device in order to open the container valve via the component.

11. The method of claim 10, wherein when the outlet vale is closed, a surface of the valve element lies on the component.

12. The method of claim 10, wherein a self closing outlet valve is formed by the component and the valve element.

13. A method for manufacturing a dispensing device for dispensing a liquid, comprising:
providing a housing part connectable to a container;
providing a first component including a discharge opening spaced apart from a delivery end;
providing a second component made of an elastically deformable material;
providing an actuating element connectable to the housing part, wherein the actuating element is a separate part from the housing part and the first and second component; and
snapping the actuating element onto the housing part,
covering at least a portion of the first component with the second component;

joining the first component and the second component in a joining area that encloses the discharge opening and extends toward the delivery end to define an elongated discharge channel disposed between the first component and the second component, the discharge channel extending between the discharge opening and the delivery end, wherein the discharge channel elastically opens when a predetermined minimum pressure is exceeded in the discharge opening, and wherein the discharge channel automatically closes when the pressure in the discharge opening is below the predetermined minimum pressure to seal the discharge opening and to prevent fluid from being dispensed through the discharge channel;

latching the first component to the housing part; and snapping the dispensing device onto a container in order to fluidically and mechanically connect an integral connection part of the first component to a delivery valve of the container, and tilting the first component when actuating the dispensing device by swiveling the actuating element on a swivel axis.

14. A dispensing device, comprising:
a pressurized container comprising a container valve;
a housing part connected to the container;
a swivelable actuating element being a separate part form the housing part; and
a component forming an outlet valve that is latched into the housing part,
wherein the component including the outlet valve is a prefabricated part that is a separate part from the housing part,
wherein the outlet valve comprises an integral or tube-like connection part,
wherein the outlet valve is mechanically and fluidically connected in form of a pluggable connection to the container valve by means of the connection part;
wherein the component or outlet valve is hingedly and depressably held by the housing part so that the container valve is opened when actuating the dispensing device by swiveling the actuating element and the component downwards; and
wherein the actuating element is adapted to act on the component by tilting the component downwards around a swivel axis.

15. The dispensing device of claim 14, wherein the actuating element is tiltably held by the dispensing device or housing part.

16. The dispensing device of claim 14, wherein the actuating element forms an upper surface, actuation surface or a cap of the dispensing device or covers the component.

17. The dispensing device of claim 14, wherein the swivel axis of the actuating element and the component is located between a stop portion and an actuating section of the actuating element.

18. The dispensing device of claim 14, wherein the connection part has a spring-elastic section.

19. A dispensing device, comprising:
a pressurized container comprising a container valve;
a housing part connected to the container;
a component forming an outlet valve,
the component being latched into the housing part, and
a swivelable actuating element being a separate part from the housing part and the component and snapped onto the housing part;
wherein the outlet valve comprises an integral or tube-like connection part,
wherein the connection part extends transverse to a dispensing direction of the dispensing device,
wherein the outlet valve is mechanically and fluidically connected to the container valve by means of the connection part;
wherein the actuating element comprises a stop portion for closing the outlet valve; and
wherein the actuating element comprises an actuating section for mechanically depressing the connection part when actuating the dispensing device;
wherein the component or outlet valve is hindgedly held by the housing part so that the container valve is opened when actuating the dispensing device by swiveling the actuating element on a swivel axis;
wherein the swivel axis of the actuating element is located between the stop portion and the actuating section.

20. The dispensing device of claim 19, wherein the swivel axis of the component complies with the swivel axis of the actuating element.

21. The dispensing device of claim 19, wherein the connection part has a spring-elastic section.

22. The dispensing device of claim 19, wherein the component or outlet valve is tiltable downwards when actuating the dispensing device.

23. The dispensing device of claim 19, wherein the component or outlet valve extends radially within the housing part.

24. The dispensing device of claim 19, wherein an elastically deformable valve element is fixed to the component to form the outlet valve.

25. The dispensing device of claim 19, wherein the outlet valve is at least essentially flat and the connection part extends transversally thereto.

26. The dispensing device of claim 19, wherein the actuating element is tiltably held by the housing part.

27. The dispensing device of claim 19, wherein the actuating element forms one of an upper surface, an actuation surface, and a cap of the dispensing device or covers the component.

28. The dispensing device of claim 19, wherein the outlet valve opens directly into the environment.

29. The dispensing device of claim 19, wherein the component and actuating element have a common swivel axis.

30. The dispensing device of claim 1, wherein the component and actuating element have a common swivel axis.

31. The method of claim 13, wherein the component and actuating element have a common swivel axis.

\* \* \* \* \*